Dec. 6, 1960 — B. FISCHER — 2,963,096
HARROW
Filed July 18, 1957 — 2 Sheets-Sheet 1
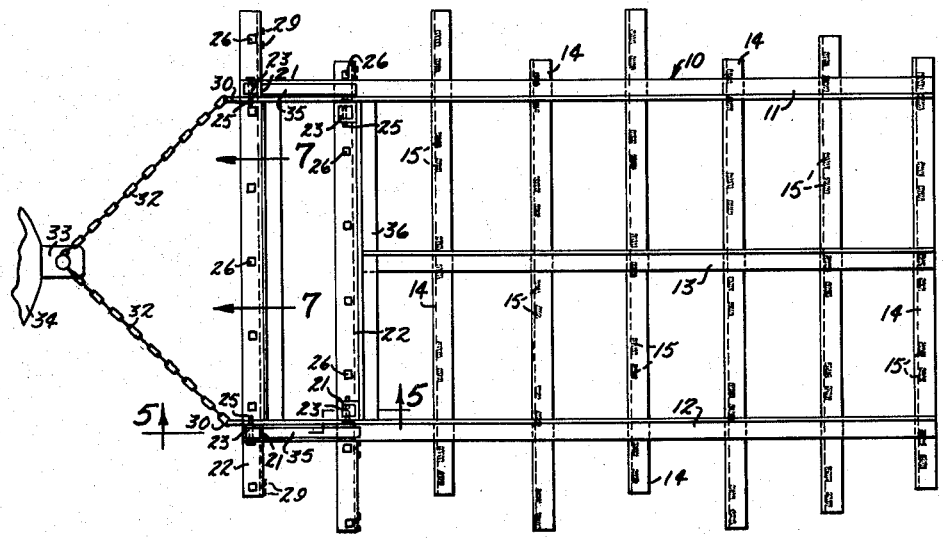
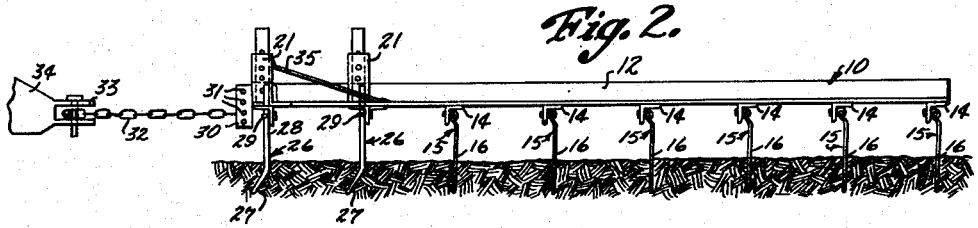
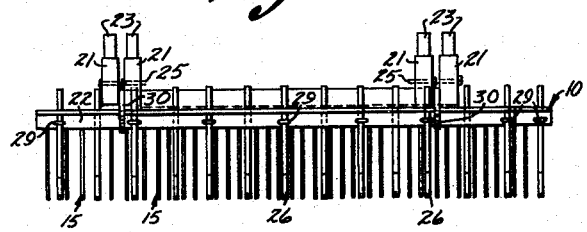
INVENTOR.
Ben Fischer.

Dec. 6, 1960 B. FISCHER 2,963,096
HARROW
Filed July 18, 1957 2 Sheets-Sheet 2
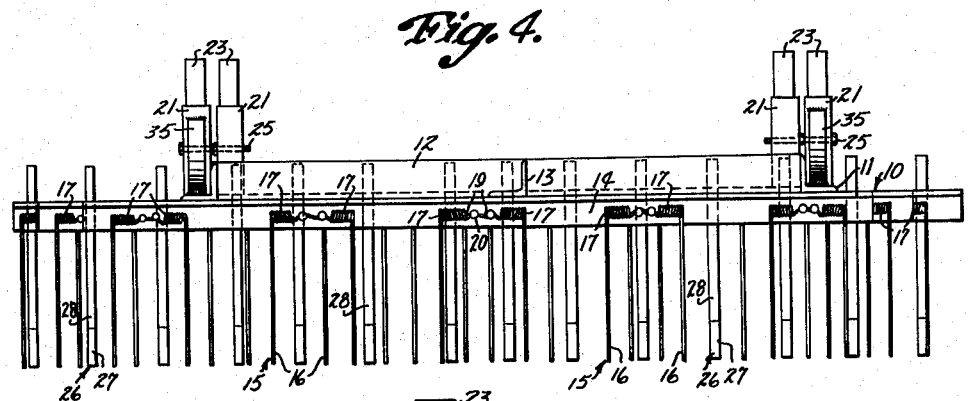
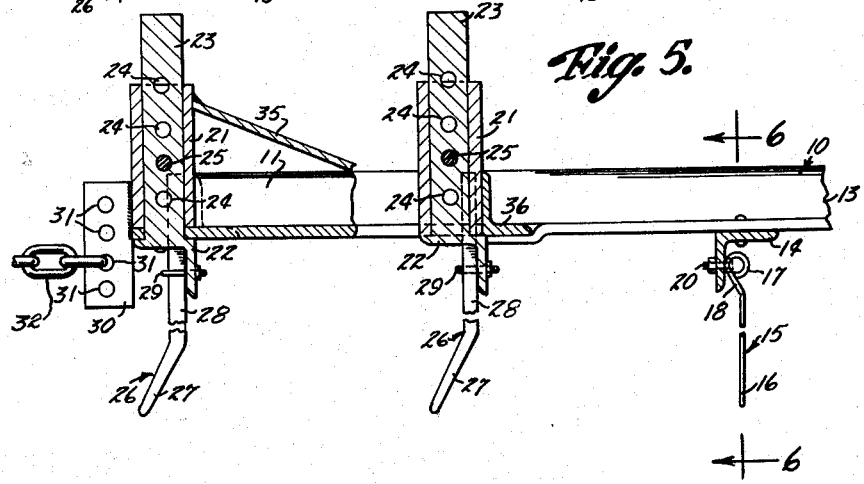
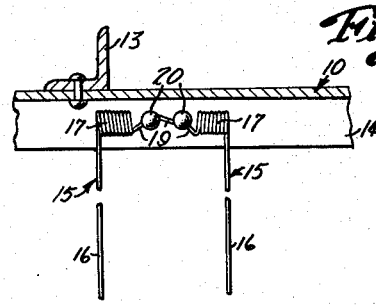
INVENTOR.
Ben Fischer
BY *Victor J. Evans & Co.*
ATTORNEYS

United States Patent Office 2,963,096
Patented Dec. 6, 1960

2,963,096

HARROW

Ben Fischer, Arlington, Calif. (Bowesmont, N. Dak.)

Filed July 18, 1957, Ser. No. 672,810

1 Claim. (Cl. 172—198)

This invention relates to agricultural equipment, and more particularly to a harrow.

The object of the invention is to provide an agricultural implement which will facilitate the cultivation and harrowing of the ground.

Another object of the invention is to provide an agricultural implement which includes a plurality of harrow teeth as well as a plurality of cultivator teeth so that the soil or ground can be simultaneously harrowed and cultivated, the present invention being constructed so that the cultivator teeth can be adjusted vertically as desired, and whereby the harrow teeth are arranged so that they have yieldability or flexibility so that they will not be damaged when working rough ground or the like, the present invention being constructed so that weeds or other foreign matter will not ordinarily become entangled in the device.

A further object of the invention is to provide an agricultural implement which is extremely simple and inexpensive to manufacture, Other objects and advantages will be apparent during the course of the following description.

In the accompanying drawings, forming a part of this application, and in which like numerals are used to designate like parts throughout the same.

Figure 1 is a top plan view of the agricultural implement, constructed according to the present invention.

Figure 2 is a side elevational view of the device.

Figure 3 is a front elevational view of the agricultural implement.

Figure 4 is an enlarged rear elevational view of the device.

Figure 5 is an enlarged sectional view taken on the line 5—5 of Figure 1.

Figure 6 is a sectional view taken on the line 6—6 of Figure 5.

Figure 7 is a sectional view taken on the line 7—7 of Figure 1, and with parts broken away for purposes of clarity.

Referring in detail to the drawings, the numeral 10 designates a frame which can be made of any suitable material, and the frame 10 includes a pair of horizontally disposed spaced parallel beams 11 and 12 which are L-shaped in cross section. Interposed between the pair of beams 11 and 12 is a beam 13 which is also L-shaped in cross section. Extending transversely beneath the beams 11, 12, 13 and secured thereto in any suitable manner, is a plurality of horizontally disposed spaced parallel support members 14.

Depending from each of the support members 14 are a plurality of harrow teeth 15, Figure 6. The harrow teeth 15 include vertically disposed shanks 16 which include inclined portions 18 that terminate in coiled portions or spring portions 17. Extending inwardly from the spring portions 17 are intermediate sections 19 which are secured to the support members 14 through the medium of suitable securing elements such as the bolts 20. Due to the construction of the harrow teeth 15 shown in Figure 6, the teeth are yieldable or resilient mounted so that in the event that rough ground is encountered, the teeth will have sufficient give to prevent breakage of the teeth.

It will be seen that the support members 14 are arranged in staggered relation with respect to each other, Figure 1, and also the harrow teeth 15 are arranged in staggered relation so that all of the ground will be effectively worked or broken up.

Extending upwardly from the front portion of the frame 10 is a plurality of spaced parallel vertically disposed casings or collars 21, Figure 5. Arranged below the front portion of the frame 10 is a plurality of horizontally spaced parallel L-shaped body members 22. Extending upwardly from the body members 22 and secured thereto or formed integral therewith are vertically disposed stems or shanks 23, and the stems 23 are adjustably mounted in the casings 21. Each of the stems 23 is provided with a plurality of spaced apart apertures or openings 24, and securing elements such as bolts or pins 25 extend through suitable apertures in the casings 21 and through certain of the apertures 24 whereby the stems 23 and body members 22 can be maintained immobile in their various adjusted positions.

Depending from each of the body members 22 is a plurality of spaced apart cultivator teeth 26. The cultivator teeth 26 each include a lower inclined portion 27 and an upper vertical portion 28 which may be secured to the body member 22 by suitable securing elements such as the U-bolts 29.

Secured to the front portion of the frame 10 is a pair of spaced parallel tongues or bars 30 which are each provided with spaced apart apertures 31, and a chain 32 is adapted to engage the openings 31 in the tongues 30, Figures 1 and 5. The chain 32 may be connected to a hitch 33 which can be arranged at the rear of a tractor 34 or other towing vehicle.

Inclined braces 35 are provided for reinforcing and strengthening the various parts, Figure 2, and a brace 36 may also be provided for reinforcing the frame, Figure 5.

From the foregoing, it is apparent that there has been provided an agricultural implement which will permit simultaneous cultivation and harrowing operations to be performed. In use, the implement can be towed behind a tractor 34 or other towing vehicles, and the cultivator teeth 26 will engage the soil or ground to effectively break up the ground. Furthermore, the present invention includes a plurality of harrow teeth 26 which also engage the ground, and these various teeth are arranged in staggered relation with respect to each other so that the entire surface of the ground will be effectively broken up or cultivated. The spring portions 19 provide a yieldable mounting for the teeth 15 whereby damage to the teeth will be prevented in the event that rocks or the like are encountered. Furthermore, by removing the pins 25, the stems 23 and teeth 26 can be adjusted vertically so that the depth of cultivation can be regulated or controlled as desired. The various support members or body members which support the various teeth are spaced apart in such a manner that weed formation or other debris will not clog or become entangled in the device. Furthermore, the parts can be readily removed and replaced when desired.

The front teeth 26 serve to cultivate the ground and these teeth can be adjusted to permit different depths of cultivation. The device can be made in different sizes and shapes. If desired, the cultivator teeth 27 can be entirely removed from the frame when they are not being used.

I claim:

In an agricultural implement, a frame including a first and second spaced parallel horizontally disposed L-shaped beam, a third L-shaped horizontally disposed beam interposed between said first and second beams and said third beam being shorter than said first and second beams, a plurality of horizontally disposed spaced parallel L-shaped support members extending transversely beneath said beams and secured thereto, and a plurality of harrow teeth depending from each of said support members and secured thereto, a plurality of spaced parallel horizontally disposed L-shaped body members extending transversely across the lower front end of said beams, vertically disposed spaced parallel hollow casings extending upwardly from the front portion of said frame and said casings having apertures therein, stems extending upwardly from said body members and projecting through said casings, there being a plurality of spaced apart apertures in each of said stems, securing elements extending through the apertures in said casings and through certain of the apertures in said stems whereby the stems and body members can be maintained immobile in their various adjusted positions, and a plurality of spaced parallel cultivator teeth depending from said body members, said cultivator teeth comprising a vertically disposed portion terminating in a lower inclined portion, and U-bolts extending through said body members and engaging said vertically disposed portions of said cultivator teeth, tongues arranged on the front end of said frame and said tongues being provided with openings therein, a chain arranged in engagement with the openings in said tongues and said chain adapted to be connected to a towing vehicle, each of said support members comprising a vertically disposed portion, said harrow teeth each comprising vertically disposed portions having coil spring sections on their upper ends, and securing elements connecting said harrow teeth to said support members, and whereby the harrow teeth are yieldably or resiliently mounted so that in the event that rough ground is encountered, the teeth will have sufficient give to prevent breakage of the teeth, said support members and body members being arranged in staggered relation with respect to each other, so that all of the ground will be effectively worked or broken up.

References Cited in the file of this patent
UNITED STATES PATENTS

| | | |
|---|---|---|
| 194,695 | Lockwood | Aug. 28, 1877 |
| 836,540 | Smith | Nov. 20, 1906 |
| 951,238 | Elliott | Mar. 8, 1910 |
| 1,022,354 | Builta | Apr. 2, 1912 |
| 1,930,850 | Colca | Oct. 17, 1933 |
| 1,935,193 | Wells | Nov. 14, 1933 |
| 2,261,666 | Selhorst | Nov. 4, 1941 |
| 2,612,825 | Walker | Oct. 7, 1952 |
| 2,736,252 | Latshaw | Feb. 28, 1956 |
| 2,758,531 | Siems | Aug. 14, 1956 |